US010489411B1

(12) United States Patent
Ahmann

(10) Patent No.: US 10,489,411 B1
(45) Date of Patent: Nov. 26, 2019

(54) INFORMATION ENTRY AND RETRIEVAL SYSTEM

(71) Applicant: Christian Nicolas Ahmann, Oberhaching (DE)

(72) Inventor: Christian Nicolas Ahmann, Oberhaching (DE)

(*) Notice: Subject to any disclaimer, the term of this patent is extended or adjusted under 35 U.S.C. 154(b) by 402 days.

(21) Appl. No.: 15/398,731

(22) Filed: Jan. 5, 2017

Related U.S. Application Data

(60) Provisional application No. 62/345,800, filed on Jun. 5, 2016, provisional application No. 62/275,251, filed on Jan. 6, 2016.

(51) Int. Cl.
*G06F 16/2457* (2019.01)
*G06F 3/0482* (2013.01)
*G06F 16/248* (2019.01)

(52) U.S. Cl.
CPC ...... *G06F 16/24578* (2019.01); *G06F 3/0482* (2013.01); *G06F 16/248* (2019.01)

(58) Field of Classification Search
None
See application file for complete search history.

(56) References Cited

U.S. PATENT DOCUMENTS

| | | | | |
|---|---|---|---|---|
| 2004/0083213 A1* | 4/2004 | Wu | ............ | G06Q 10/10 |
| 2004/0139106 A1* | 7/2004 | Bachman | ............ | G06F 16/951 |
| 2005/0096924 A1* | 5/2005 | Enis | ............ | G06F 11/2257 |
| | | | | 705/1.1 |
| 2005/0097070 A1* | 5/2005 | Enis | ............ | G06N 20/00 |
| | | | | 706/50 |
| 2005/0097507 A1* | 5/2005 | White | ............ | G06Q 30/02 |
| | | | | 717/102 |
| 2008/0034060 A1* | 2/2008 | Fisher, Jr. | ............ | G06F 9/453 |
| | | | | 709/218 |
| 2008/0262860 A1* | 10/2008 | Schneider | ............ | G06Q 10/10 |
| | | | | 705/1.1 |
| 2010/0077008 A1* | 3/2010 | Davis | ............ | G06F 16/93 |
| | | | | 707/797 |
| 2014/0195463 A1* | 7/2014 | Jacobs | ............ | G06N 5/00 |
| | | | | 706/11 |

* cited by examiner

*Primary Examiner* — Kenny S Lin
(74) *Attorney, Agent, or Firm* — Eric S. Barr; Roberts Mlotkowski Safran Cole & Calderon, P.C.

(57) ABSTRACT

A method and system for saving of information or solutions by Solution Providers enabling quick retrieval of matching information or solutions to Solution Seekers, is disclosed. In an embodiment, Solution Seekers can click on a number of specifications, thereby expressing their individual situations, and only matching solutions for those specific situations are retrieved. Furthermore, relationships of specifications with respect to each other can be defined, such as mutually exclusive specifications or specification hierarchies, which ensure that only potentially relevant specifications are displayed to Solution Seekers, thereby further increasing the speed with which Solution Seekers can identify matching solutions. Also, Solution Seekers may set up unresolved problems, so that Solution Providers can identify for which situations no matching solutions exist yet so that those can be submitted.

17 Claims, 14 Drawing Sheets

Enter a new solution for problem...

No Internet Connection — 302

1.) What's your solution?
Please only enter one solution (why?)

Title   0/85

[ Your solution in a few words... ] — 304

Description

B U I Format ▾ 66 ≡ ≔ ≡ — ⌀ ⌸ ⟨⟩ — 306

INFORMATION ENTRY AND RETRIEVAL SYSTEM

CROSS-REFERENCE TO RELATED APPLICATIONS

This application claims priority to and the benefit of U.S. Provisional Patent Application No. 62/275,251, filed on Jan. 6, 2016, and U.S. Provisional Patent Application No. 62/345,800, filed on Jun. 5, 2016, the disclosure of which are incorporated by reference herein in their entireties.

BACKGROUND

Field

The present disclosure relates generally to the field of information storage and retrieval, and in particular to enabling researchers to quickly retrieve the information they need in a way which significantly reduces the required time to find such information.

Description of the Related Art

The rise of the internet made it very convenient for content providers to make their content accessible to the public, allowing the public to find information on almost any topic in a cost-effective manner. However, a major challenge for researchers is to find relevant content, as the internet offers a very large amount of information. A very popular way to assist researchers to find relevant information are search engines, such as Google, which work by the researcher entering keywords which are expected to appear on content pages which contain information the researcher is interested in. Search engines then retrieve links to the content pages which contain the entered keywords, which the researcher can click on to get directed to those content pages.

Despite the high usefulness and popularity of search engines, finding relevant content can still be a time-consuming challenge. A reason for this lies in the keyword-centric approach used by search engines, which fails to retrieve the correct information if the researcher's request can only be described adequately by entering several keywords. For example, if a researcher is looking for a solution to a certain problem (such as "No internet access") and the problem requires several keywords to adequately describe the specific situation (such as "Using a mobile phone", "Using Wi-Fi", "Worked fine a few minutes ago"), then entering all those keywords in a search engine will retrieve a significant number of irrelevant search results. This is because the entered keywords may appear in different locations on the content sites, and are not linked in terms of context, and therefore the retrieved content sites may not reflect the researcher's situation. Therefore, many of the retrieved content sites may not be relevant for the researcher, and the researcher has to browse through many retrieved content sites to identify the one(s) which are relevant. This can be a very time-consuming process.

Therefore, there is a need for a technology which allows quick retrieval of relevant information even in cases where the researcher's request is complex and cannot be captured in a small number of keywords. Exemplary embodiments may address this and other problems.

SUMMARY OF THE INVENTION

A method for the saving of information or solutions by Solution Providers enabling quick retrieval of matching information or solutions to Solution Seekers, is disclosed. In one embodiment, Solution Providers link their entered solutions to one or more specifications (or "tags") by giving said specifications certain values, indicating if their solution works, doesn't work, or does not work more or less likely if the Solution Seekers selected respective specifications. Upon selecting the specifications by the Solution Seekers, for example on the front-end of a website, only solutions will be displayed with matching specifications.

In order to facilitate the selection of specifications by Solution Seekers, and to avoid an information overload by too many specifications getting displayed to the Solution Seeker to choose from, relationship of specifications with respect to each other may be defined, such as mutually exclusive specifications, making specifications disappear if a mutually exclusive specification has been selected, or mother-child-specification relationships, whereby certain child specifications are only displayed to Solution Seekers once their respective mother specification has been selected.

In another embodiment, Solution Seekers may set up an unresolved problem, or information request, where no fitting solutions exist yet, by selecting existing specifications or adding new specifications themselves, thereby showing potential Solution Providers which specific problems they are facing, for which no solutions exist yet. Solution Providers can therefore see for which specific problem situations solutions are needed and submit solutions accordingly.

In accordance with these and other objects, which will become apparent hereinafter, the exemplary embodiments will now be described with particular reference to the accompanying drawings.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

FIG. 3 is an illustration of the upper part of a solution entry webpage where a Solution Provider can enter a new solution, according to an embodiment;

DETAILED DESCRIPTION

The disclosed embodiments describe examples of a method (and corresponding system and computer program product) for allowing users to enter and retrieve information such as solutions. As described herein, a Solution Provider or Information Provider is a user who enters a solution or information into a central solutions platform, and a Solution Seeker or Information Seeker is a user who is looking for solutions or information. By using the central solutions platform according to an embodiment, a user may also take both the roles of a Solution Seeker, to find solutions to a problem, as well as the role of Solution Provider, by submitting solutions helping other users to find solutions to their problems.

The figures and the following description relate to embodiments by way of illustration only. Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. It should be noted that from the following discussion, alternate embodiments of the structures and methods disclosed herein will be readily recognized by one skilled in the art as viable alternatives that may be employed without departing from the principles described herein.

Figure 1:
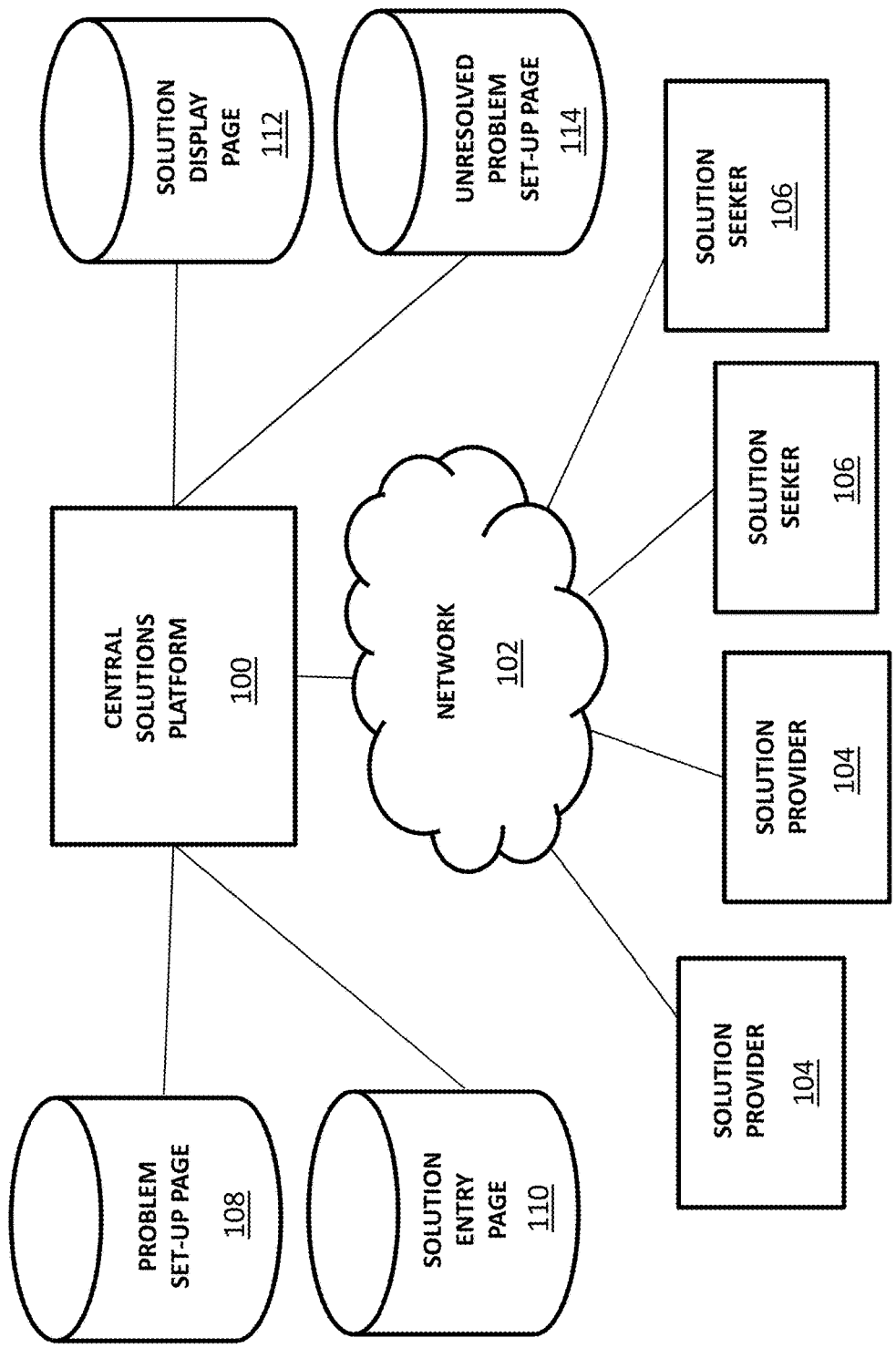
FIG. 1 is a block diagram illustrating a system for use as a central solutions platform, according to an embodiment.

Referring now to FIG. 1, a central solutions platform 100 provides for the setting up of a problem on a problem set-up page 108, the entering of solutions by Solution Providers 104 and the display of solutions to Solution Seekers 106 through a network 102. Solutions can be entered on a solution entry page 110 by Solution Providers 104 and displayed to Solution Seekers 106 on a solution display page 112. During the process of displaying solutions on the solution display page 112, Solution Seekers 106 can make selections in order to see only matching solutions (as explained further below). Furthermore, Solution Seekers 106 can submit their specific unresolved problems, or information requests, on an unresolved problem set-up page 114, thereby showing Solution Providers 104 that one or more new solutions are needed, as explained further below.

Figure 2:
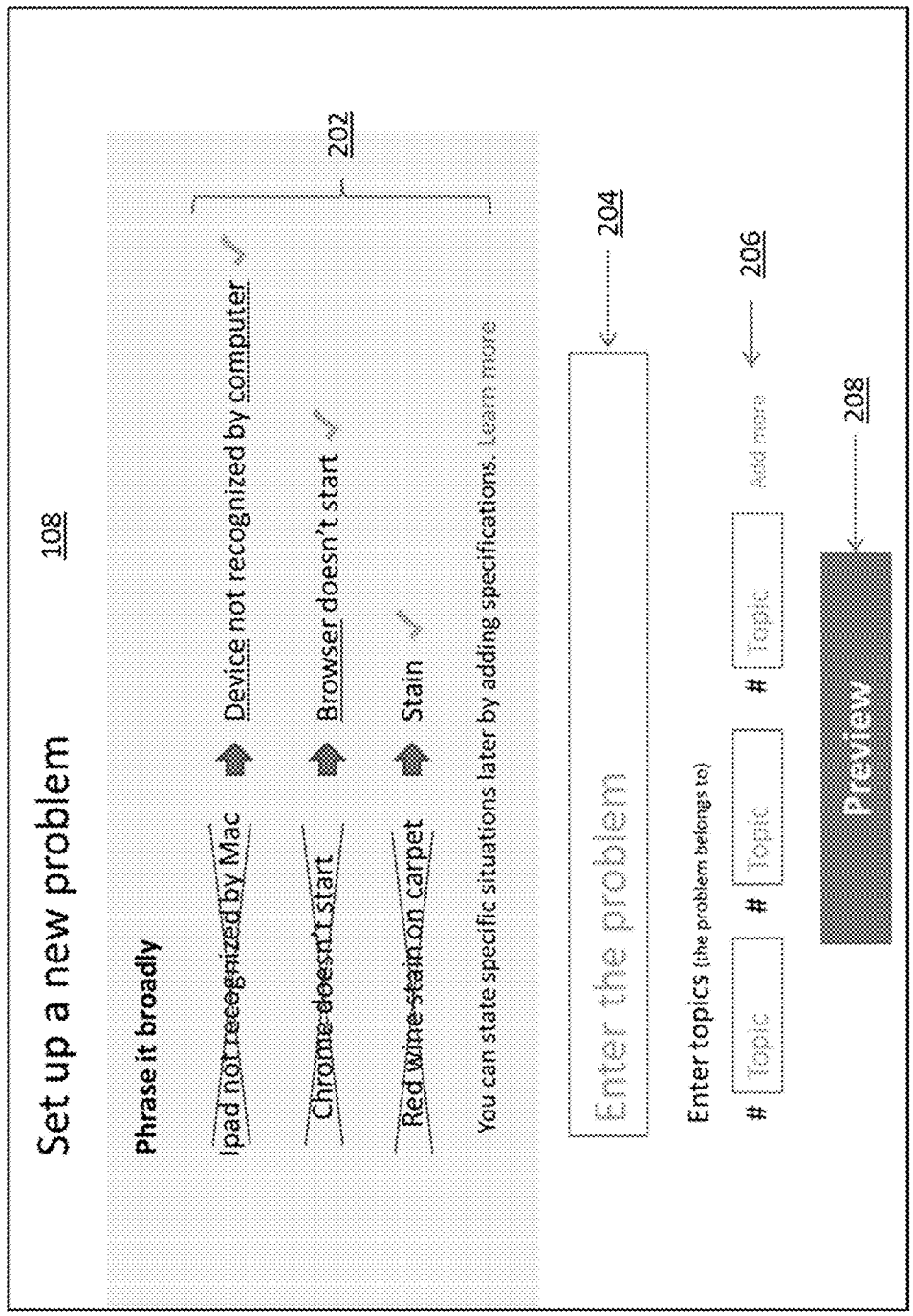
FIG. 2 is an illustration of a form which allows a user to set up a new problem, according to an embodiment.

Referring now to FIG. 2, a problem set-up page 108 is displayed. A user may get directed to this page via a link from another webpage on the central solution platform 100, such as the homepage. On the problem set-up page 108 a user such as a Solution Provider 104 or a Solution Seeker 106 or any other user can set up a problem so that a solution display page 112 gets set up by the central solutions platform 100. The problem set-up page 108 may contain instructions 202 on how to set up the problem correctly, a field 204 for entering the problem name, one or more fields 206 to give the problem certain tags so that it can be easily found on the central solutions platform 100 as well as a button 208 to set up the problem directly or to lead the user to a preview page which allows the user to preview and edit the entered preliminary problem before it is finally set up on the central solutions platform 100.

Referring now to FIG. 3, the solution entry page 110 which can be used by a Solution Provider 104 to enter a new solution on the central solutions platform 100 may include an upper part which includes the problem name 302 for which the Solution Provider 104 is entering the solution, a field for the title 304 and the description 306 of the solution.

Figure 4:
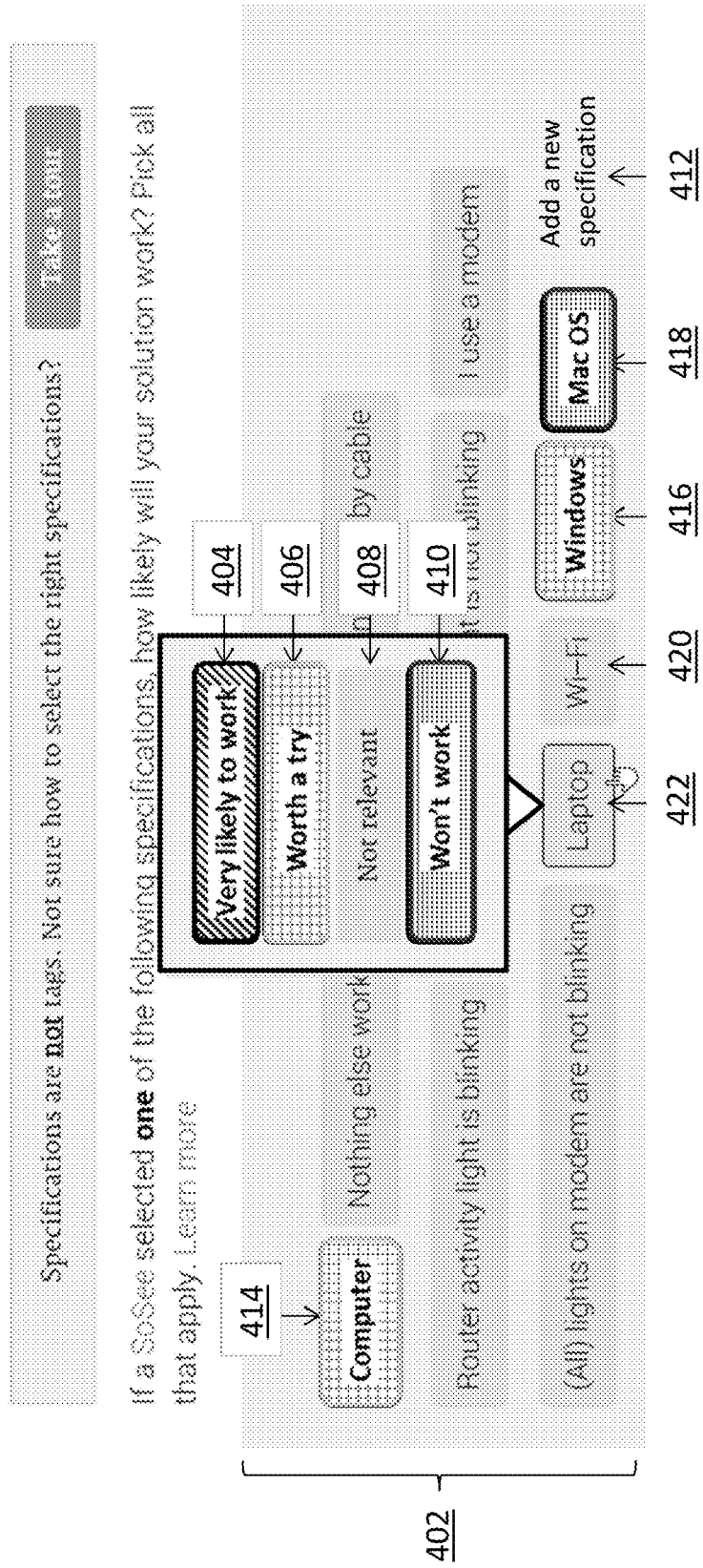
FIG. 4 is an illustration of the middle part of a solution entry webpage where a Solution Provider can give values to single specifications for the entered solution, according to an embodiment.

Referring now to FIG. 4, the solution entry page 110 may include a middle part where the Solution Provider 104 can give values to (single) specifications in the specifications area 402. Specifications can be seen as tags linked to a certain problem, allowing the Solution Provider 104 to express how the entered solution relates to those specifications by giving said specifications certain values. Those specification values will be used by the central solutions platform 100 to determine if this solution should be displayed to the Solution Seekers 106 on the solution display page 112 based on the Solution Seekers' 106 selected specifications, as outlined further below.

Solution Providers 104 can give values to specifications which have already been set up by other Solution Providers 104 for the respective problem, or they can add new specifications via a link 412 which opens a pop-up or lightbox where the Solution Provider 104 can enter the new specification. A specification value may be given by the Solution Provider 104 by moving the mouse over a specification such as "Laptop" 422, which may open a tooltip or pop-up displaying the possible value types the Solution Provider 104 can give to that specification.

A specification value can either be positive, neutral or negative. For example, in the captured screenshot the Solution Provider 104 has already given a positive value such as "Worth a try" 406, displayed with a checked background with light green color, to the specifications "Computer" 414 and "Windows" 416. Another positive value of a specification may be "Very likely to work" 404, displayed with a diagonally striped background in dark green, which the Solution Provider 104 can give to a specification to express that the entered solution is especially relevant for that specification. Both "Very likely to work" 404 and "Worth a try" 406 are positive values. The Solution Provider 104 can also give a negative value to a specification such as "Won't work" 410, displayed with a horizontally striped background in red, which has been given in the captured screenshot to the specification "Mac OS" 418. The third possible value type for a specification is neutral, or "Not relevant" 408, displayed in grey without any pattern fill, which has been given to most specifications displayed on the captured screenshot, such as the specification "Wi-Fi" 420. The neutral value may be given to all specifications by default, and only changes once the Solution Provider 104 decides to give the specification a different value.

Figure 5:
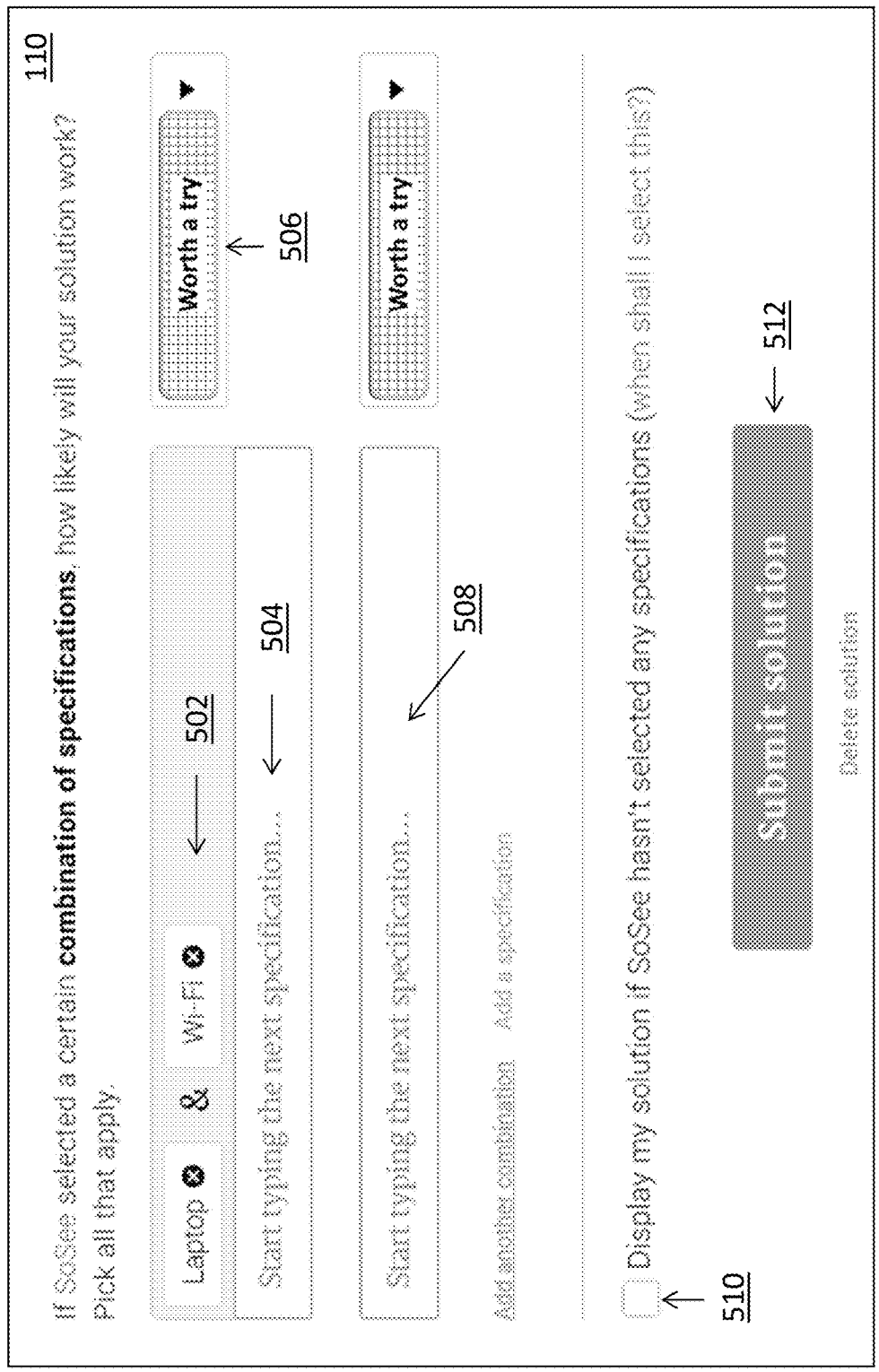
FIG. 5 is an illustration of the bottom part of a solution entry webpage where a Solution Provider can give values to combinations of specifications for the entered solution, according to an embodiment.

Referring now to FIG. 5, the solution entry page 110 may include a bottom part where the Solution Provider 104 can enter specification combinations in a field 504 and give these combinations a specification value 506. These values can be identical to the ones given to single specifications as described above. For example, in the captured screenshot the Solution Provider 104 has already entered a specification combination 502 consisting of specifications "Laptop" and "Wi-Fi", and given this combination a value of "Worth a try" 506. Further specification combinations can be entered in separate fields below 508. Furthermore, the Solution Provider 104 can select a checkbox 510 which will display the solution to Solution Seekers 106 on the solution display page 112 if Solution Seekers 106 have not selected any specifications on the solution display page 112. Once the Solution Provider 104 entered all information on the solution entry page 110, the information can be submitted to the central solutions platform 100 in response to Solution Provider 104 clicking on a button 512.

Figure 6:
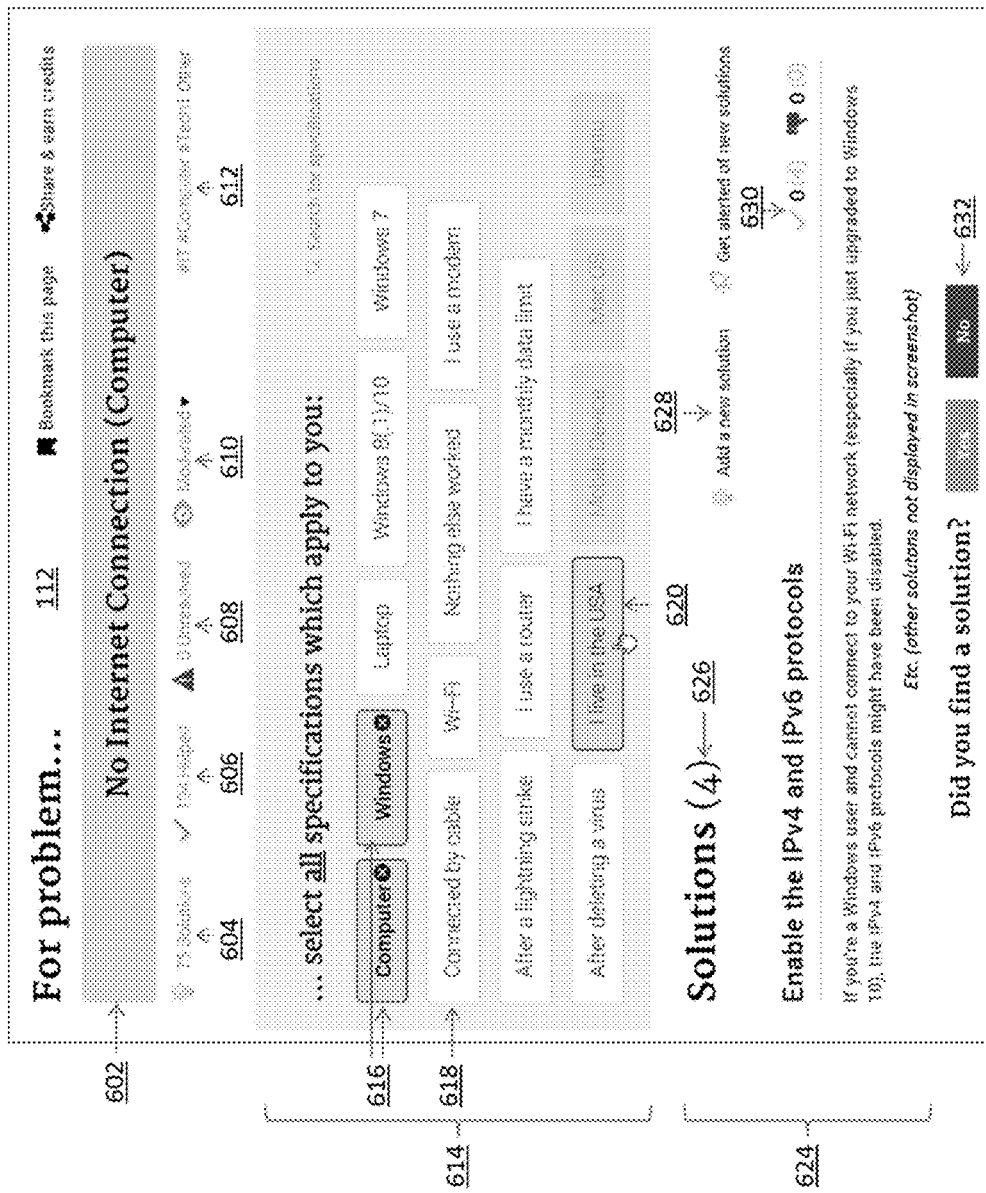
FIG. 6 is an illustration of a solution display webpage where Solution Seekers can select from the provided specifications, resulting in the display of matching solutions, according to an embodiment.

Referring now to FIG. 6, a solution display page 112 is displayed. A solution display page 112 may get displayed after the user clicks on a link on another webpage of the central solution platform 110, such as the homepage, which may list all available solution display pages 112. The solution display page 112 may contain the problem name 602, the number of solutions 604 which have been submitted to this problem, the number of upvotes 606 all solutions for this problem received from users by clicking on the respective upvote buttons 630, the number of unresolved problems 608 for this problem which Solution Seekers 106 submitted, information about the supervision status 610 of this problem, the problem tags 612, a section for the specifications area 614 where Solution Seekers 106 can select all specifications which apply to them, an area where solutions get displayed 624 and a link 628 which Solution Providers 104 can click on to get directed to the Solution entry page 110. Which solutions get displayed in this solution area 624 directly depends on which specifications the Solution Seekers 106 selected in the specifications area 614.

The solution display page 112 illustrated in FIG. 6 shows an embodiment in which a Solution Seeker 106 has already selected the specifications 616 "Computer" and "Windows" and is about to select a third specification, "I live in the USA" 620. Other specifications, such as "Connected by cable" 618, are currently not selected. Based on those selections, the area where the solutions are displayed 624 re-loads dynamically with every selection or deselection of a specification by the Solution Seeker 106, such that only the solutions which are relevant to the selected specifications are displayed. In this example, from a total of 75 solutions, as indicated on the top of the page 604, the central solutions platform 100 determined that, based on the Solution Seeker's 106 selections in the specification area 614, and the specification values given by the Solution Providers 104 as outlined above, only 4 solutions, as indicated at the bottom of the page 626, are relevant, thereby enabling the Solution Seeker 106 to find the relevant information substantially faster.

Figure 7:
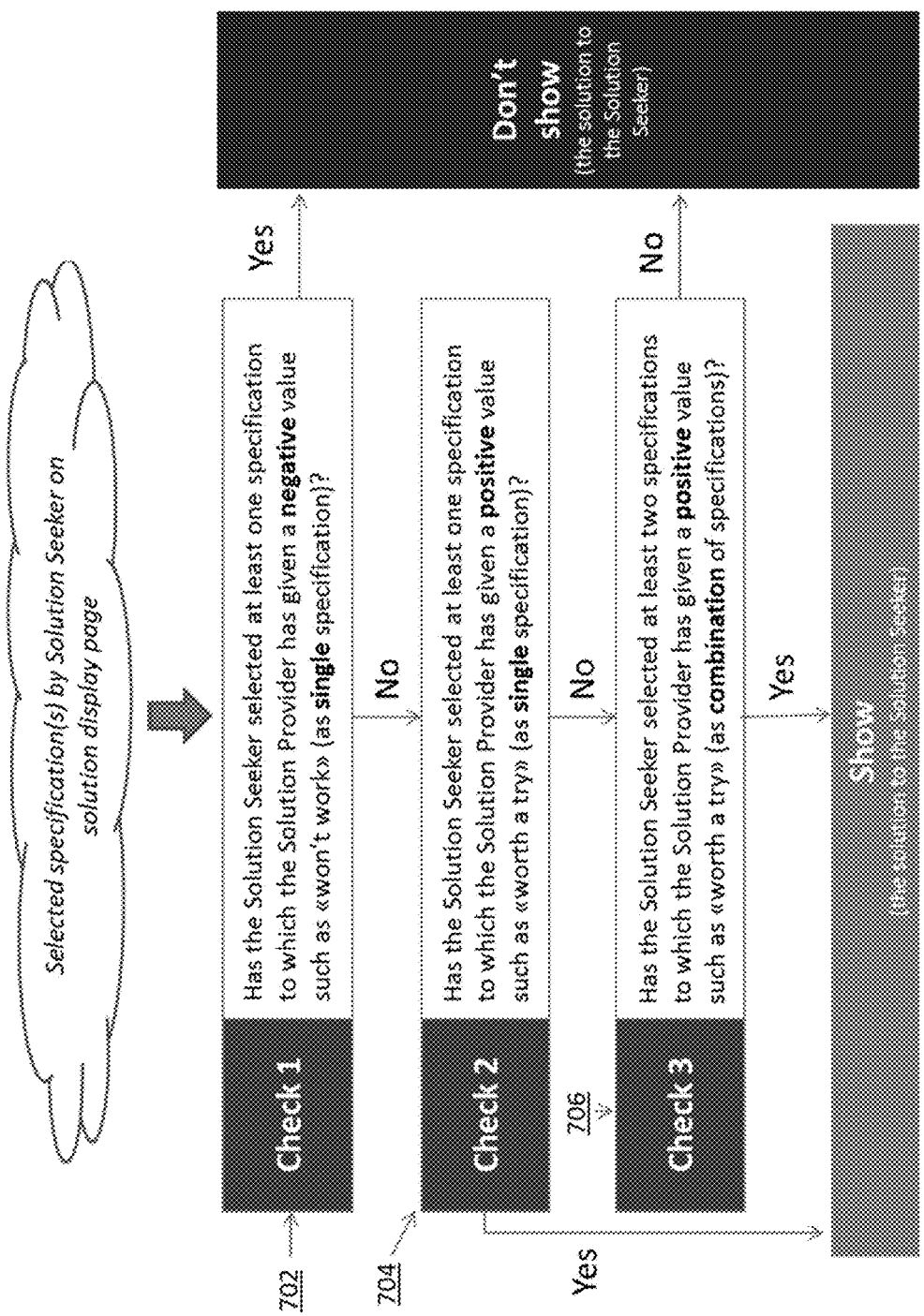
FIG. 7 is a diagram illustrating a decision tree for the central solutions platform to determine if solutions should be displayed to Solution Seekers on the solution display page based on the specifications the Solution Seeker selected, according to an embodiment.

Referring now to FIG. 7, an example for a decision tree is shown which is applied by the central solution platform 100 on every solution for a specific problem, to determine which solutions should be displayed to Solution Seekers 106 on the solution display page 112 in the solutions area 624 based on the Solution Seekers' 106 selections in the specification area 614 on the solution display page 112.

The decision tree may include a first check 702 which checks if the Solution Seeker 106 selected at least one specification on the solution display page 112 for which the Solution Provider 104 has given a negative value, such as "won't work" 410, to this single specification on the solution entry page 110. If that is the case, the solution may not be displayed to the Solution Seeker 106 on the solution display page 112, even if the Solution Seeker has selected one or more other specifications for which the Solution Provider 104 has given a positive value, such as "very likely to work" 404 or "worth a try" 406. For example, a Solution Provider 104 may have submitted a solution titled "Restart your Mac" to the problem "No internet connection" and given the specification "Windows" a negative value such as "Won't work" 410. Then, if a Solution Seeker 106 selects this specification on the solution display page 112, the solution "Restart your Mac" will not get displayed in the solutions area 624 on the solution display page 112, no matter what other specifications the Solution Seeker 106 selected.

Furthermore, the decision tree may include a second check 704 which checks if the Solution Seeker 106 selected at least one specification on the solution display page 112 for which the Solution Provider 104 has given a positive value such as "Very likely to work" 404 or "Worth a try" 406 to a single specification on the solution entry page 110. If that is the case, the solution may be displayed to the Solution Seeker 106 in the solutions area 624 on the solution display page 112.

Lastly, the decision tree may include a third check 706 which checks if the Solution Seeker 106 selected at least two specifications on the solution display page 112 which the Solution Provider 104 selected as specification combination 502 and has given this specification combination 502 a positive value, such as "Very likely to work" 404 or "Worth a try" 406, on the solution entry page 110 for a specific solution. If that is the case, the solution may be displayed to the Solution Seeker 106 in the solutions area 624 on the solution display page 112.

If none of above mentioned criteria are met, i.e. all checks returned a negative result, the solution may not be displayed to the Solution Seeker 106 in the solutions area 624 on the solution display page 112.

Figure 8:
FIG. 8 is an illustration of an unresolved problem entry webpage where Solution Seekers can specify their unresolved problem by selecting from existing specifications or entering new ones, according to an embodiment.

Referring now to FIG. 8, an unresolved problem set-up or entry page 114 is displayed. An unresolved problem entry page 114 may get displayed if a Solution Seeker 106 clicks on a button 632 on the solution display page 112. The unresolved problem entry page 114 allows a Solution Seeker 106 to specify a situation for which no working solution is yet available on the solution display page 112. The unresolved problem entry page 114 includes the name of the problem 802, an area to select from existing specifications 804 as well as an area to provide further information 806 so that all information is collected which comprehensively describes the Solution Seeker's 106 situation, so that Solution Providers 104 have all the information they need to submit a fitting solution. Once the Solution Seeker 106 provided all information on this page, the unresolved problem can be submitted to the central solutions platform 100 by clicking on a respective button 808.

Figure 9:
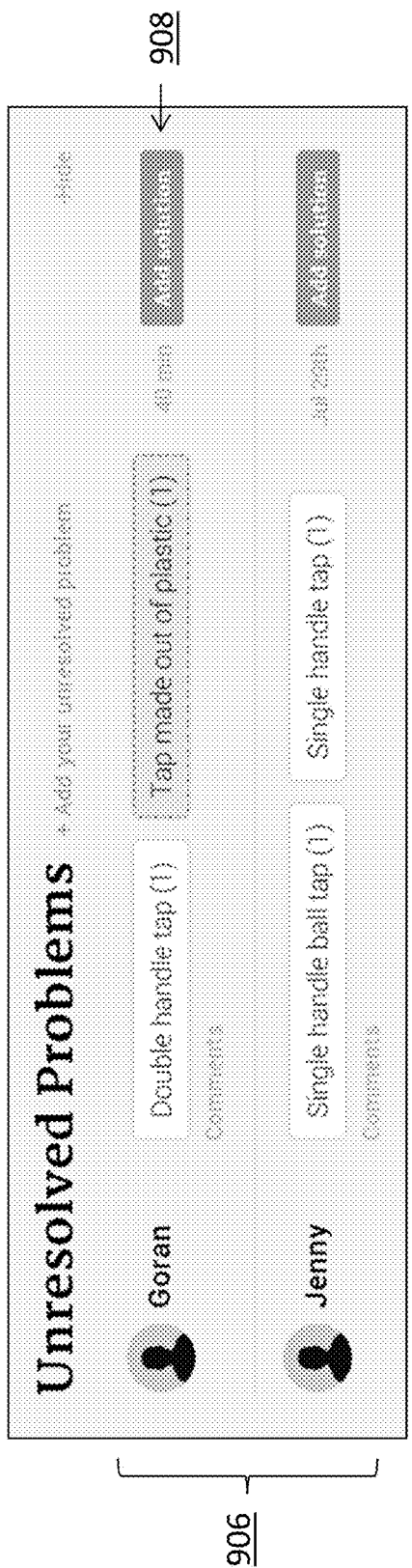
FIG. 9 is an illustration of a webpage providing a list of unresolved problems to which Solution Providers can submit solutions, according to an embodiment.

Referring now to FIG. 9, a list 906 of unresolved problems for a certain problem is displayed, for example at the bottom of the solution display page 112 after a user clicked on a respective link 608 at the top of the solution display page 112. Solution Providers 104 can then start the submission of fitting solutions by clicking on a respective button 908, taking them to the solution entry page 110. Upon submission of the respective solution by the Solution Providers 104 the Solution Seeker 106 who entered said unresolved problem may get alerted, such as by email.

Figure 10:
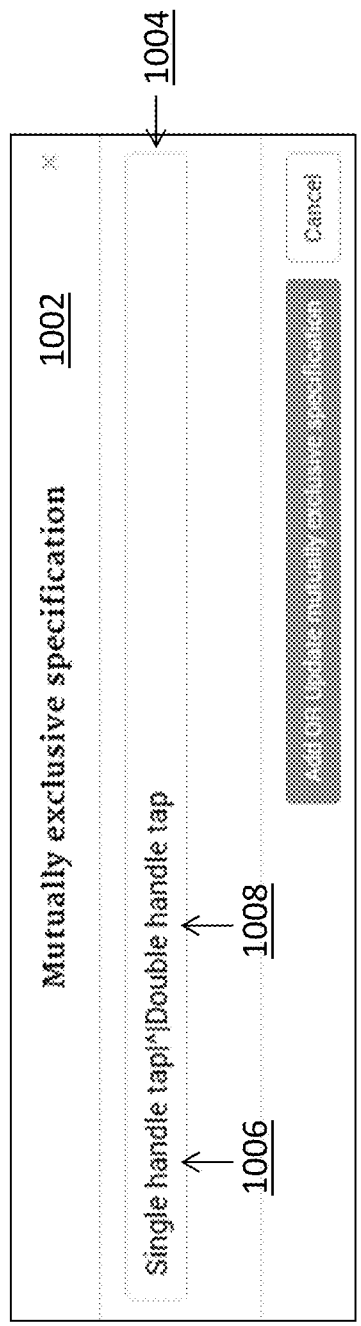
FIG. 10 is an illustration of a webpage where a user can define specifications to have a mutually exclusive relationship with respect to each other, according to an embodiment.
Figure 11:
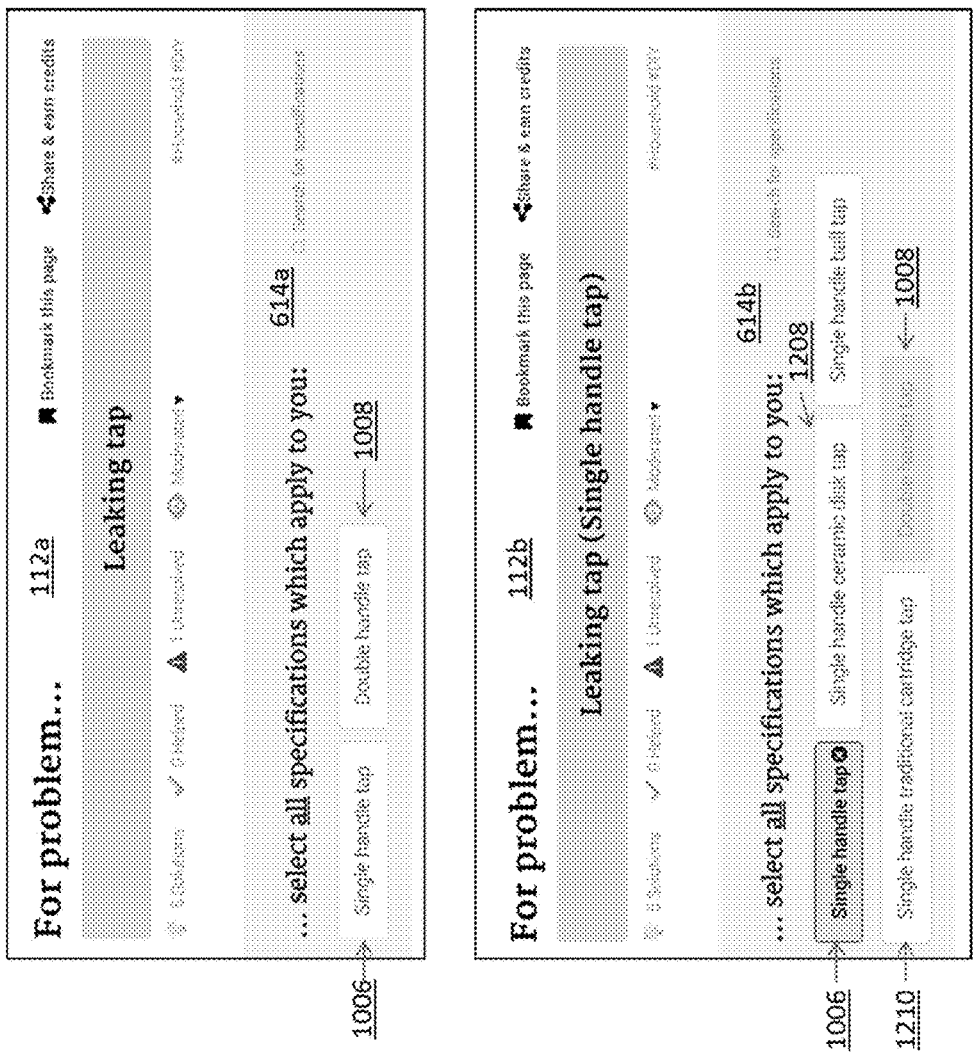
FIG. 11 is an illustration of a solution display webpage showing which specifications get displayed based on the defined specification relationships and the Solution Seekers selections of the same, according to an embodiment.

Referring now to FIG. 10, a webpage is illustrated for defining the relationships of specifications with respect to each other. The objective of this is to only display specifications to Solution Seekers 106 on the solution display page 112, and more specifically in the specifications area 614, which are relevant, and exclude all irrelevant ones. For example, a user, such as a problem moderator, can define two or more specifications as mutually exclusive to each other on a respective screen 1002, by entering those specifications in a respective field 1004. The impact of this is that once the Solution Seeker 106 has selected one of those mutually exclusive specifications in the specifications area 614, all other specifications in this group of mutually exclusive specifications either get removed entirely from the specifications area 614, or get greyed out and moved to the bottom of the list of specifications. An example for this can be seen in FIG. 11, which displays two captured screenshots of the solution display page 112, whereby the first screenshot 112a shows the specifications area 614a where the Solution Seeker 106 has not selected any specifications yet, and the second screenshot 112b shows the specification area 614b where the Solution Seeker 106 has selected the specification "Single handle tap" 1006. As the specifications "Single handle tap" 1006 and "Double handle tap" 1008 have been defined as mutually exclusive, as shown in the entry screen for mutually exclusive specifications 1002 in FIG. 10, the specification "Double handle tap" 1008 has been greyed out and moved to the bottom of the list in the specifications area 614b. Defining mutually exclusive specifications is crucial in order to allow Solution Seekers 106 to quickly select the specifications which are relevant for them, and preventing Solution Seekers 106 from losing time by reading through specifications which are not relevant any longer based on previous selections of specifications. Specifications can be seen as questions, for example the specification "Single handle tap" 1006 is equivalent to the question "Do you use a single handle tap? If yes, click here!" so without the feature of mutually exclusive specifications, the central solution platform 100 would ask the Solution Seekers 106 questions which are no longer relevant based on the previously selected specification by the Solution Seekers 106.

Figure 12:
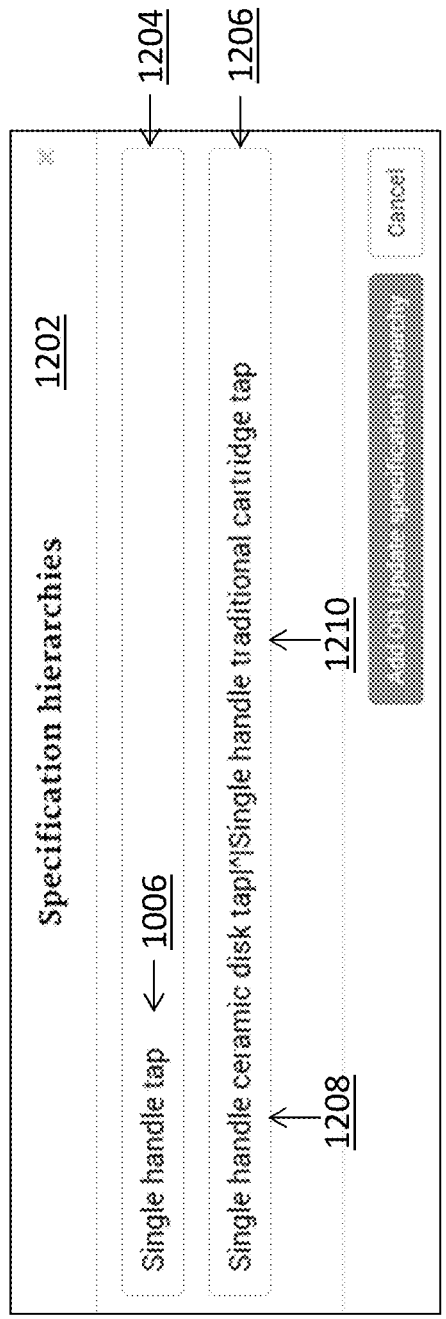
FIG. 12 is an illustration of a webpage where a user can define specifications to have a mother-and-child relationship with respect to each other, according to an embodiment.

Referring now to FIG. 12, a user, such as a problem moderator, can also define a specification hierarchy or "mother-and-child relationship" on a respective screen 1202 by entering a mother specification, such as "Single handle tap" 1006 in a respective field 1204, and by entering related child specifications, such as "Single handle ceramic disk tab" 1208 and "Single handle traditional cartridge tap" 1210 in a respective field 1206. The impact of this is that the child specifications only get displayed to the Solution Seeker 106 in the specification area 614 on the solution display page 112 once the Solution Seeker 106 selected their respective mother specification. An example for this can be seen in FIG. 11, where none of the child specifications "Single handle ceramic disk tap" 1208 nor "Single handle traditional cartridge tap" 1210 are displayed in the specifications area 614a of the first screen 112a where the Solution Seeker 106 hasn't selected the specification "Single handle tap" 1006 yet. However, once the specification "Single handle tap" 1006 is selected, the child specifications for "Single handle tap" 1006, which are in this example "Single handle ceramic disk tap" 1208 and "Single handle traditional cartridge tap" 1210, get displayed, as shown in the specification area 614b of the second screen 112b. Similar as with the mutually exclusive specifications, the mother-child-relationships or specification hierarchies ensure that only those specifications are shown to Solution Seekers 106 which may be relevant, thereby enabling Solution Seekers 106 to state their situation much quicker.

Figure 13:
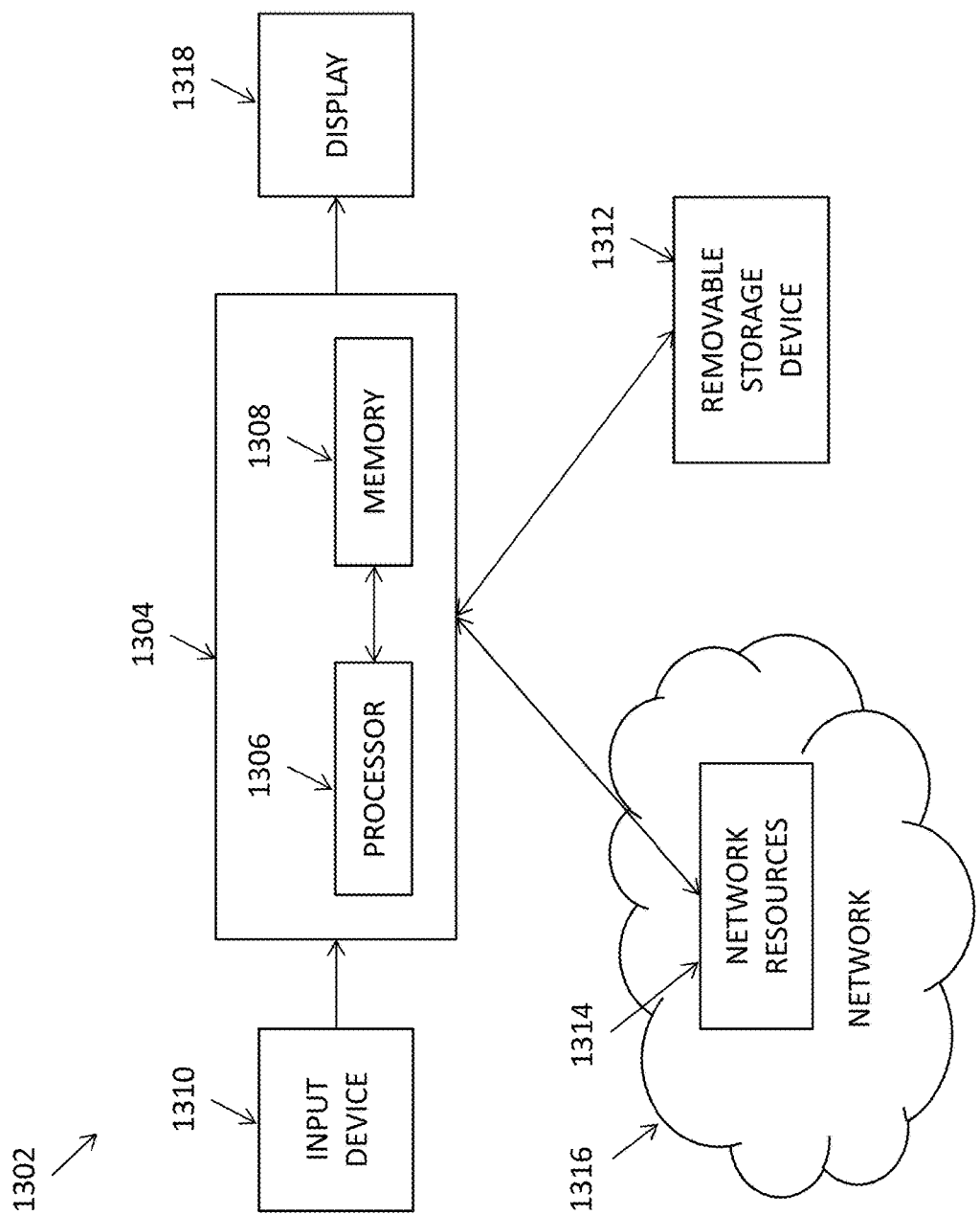
FIG. 13 is a block diagram illustrating a computer system upon which the information entry and retrieval system may be implemented, according to an embodiment.

FIG. 13 is a block diagram illustrating a computer system 1302 upon which the information entry and retrieval system may be implemented, according to an embodiment. The system 1302 includes a computer/server platform 1304 including a processor 1306 and memory 1308 which operate to execute instructions, as known to one of skill in the art. The term "computer-readable storage medium" as used herein refers to any tangible medium, such as a disk or semiconductor memory, that participates in providing instructions to processor 1306 for execution. Additionally, the computer platform 1304 receives input from a plurality of input devices 1310, such as a keyboard, mouse, touch device, touchscreen, or microphone. The computer platform 1304 may additionally be connected to a removable storage device 1312, such as a portable hard drive, optical media (CD or DVD), disk media, or any other tangible medium from which a computer can read executable code.

The computer platform 1304 may further be connected to network resources 1314 which connect to the Internet or other components of a local public or private network. The network resources 1314 may provide instructions and data to the computer platform 1304 from a remote location on a network 1316. The connections to the network resources 1314 may be via wireless protocols, such as the 802.11 standards, Bluetooth® or cellular protocols, or via physical transmission media, such as cables or fiber optics. The network resources may include storage devices for storing data and executable instructions at a location separate from the computer platform 1304. The computer platform 1304 interacts with a display 1318 to output data and other information to a user, as well as to request additional instructions and input from the user. The display 1318 may be a touchscreen display and may act as an input device 1310 for interacting with a user.

Figure 14:
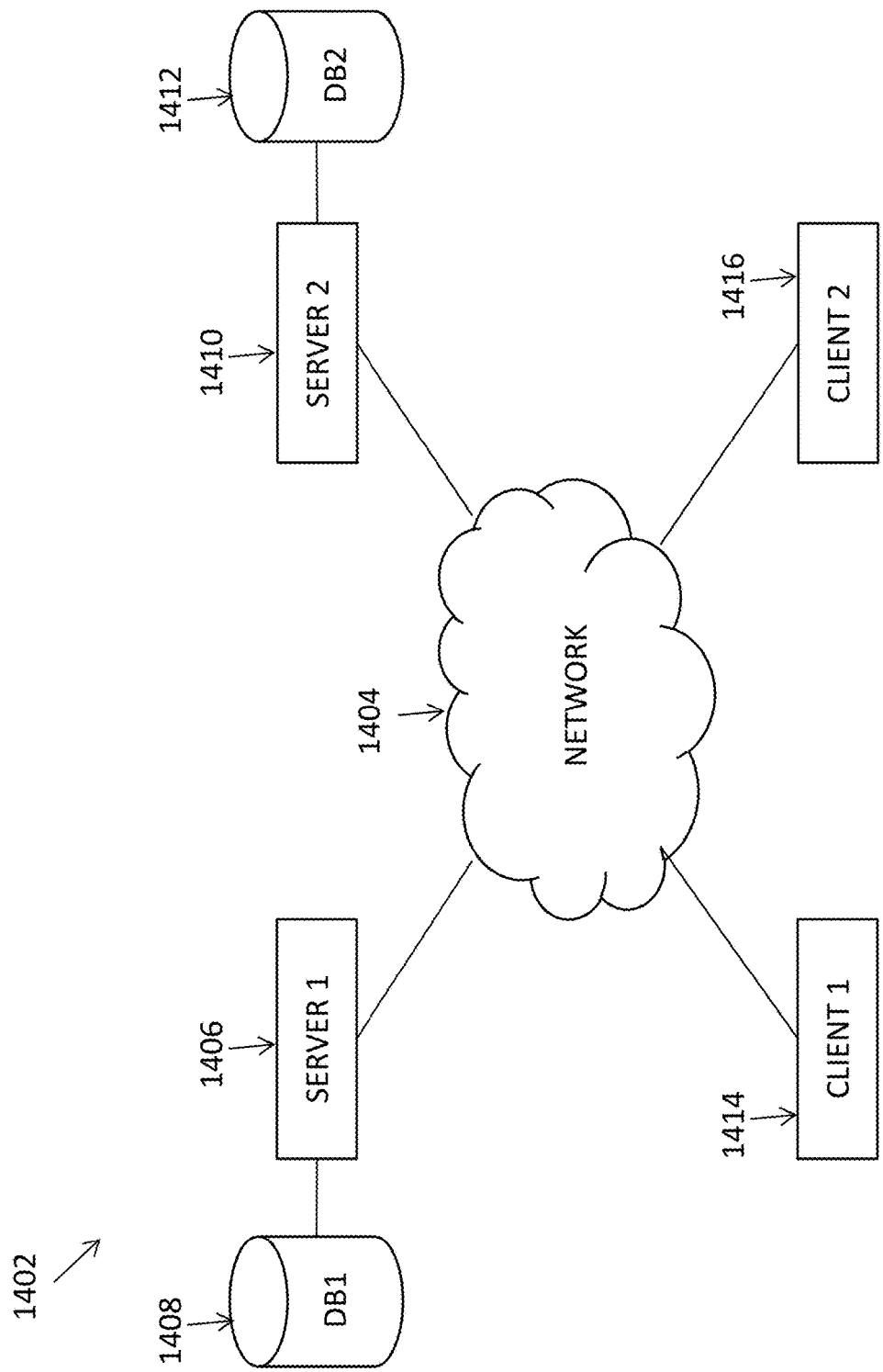
FIG. 14 is a block diagram illustrating a network including servers upon which the system may be implemented, according to an embodiment.

FIG. 14 is a block diagram that illustrates an embodiment of a network 1402 including servers 1406, 1410 upon which the system may be implemented and client machines 1414, 1416 that communicate with the servers 1406, 1410. The client machines 1414, 1416 communicate across the Internet or another wide area network (WAN) or local area network (LAN) 1404 with server 1 1406 and server 2 1410. Server 1 1406 communicates with database 1 1408, and server 2 1410 communicates with database 2 1412. According to an embodiment, one or both of server 1 1406 and server 2 1410 may implement an information entry and retrieval system. Client 1 1414 and/or client 2 1416 may interface with the system and request server 1 1406 and/or server 2 1410 to perform processing. Server 1 1406 may communicate with or otherwise receive information from database 1 1408 or another internal or external data source or database, and server 2 1410 may communicate with database 2 1412 or another internal or external data source or database.

The foregoing detailed description has set forth various embodiments via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, or virtually any combination thereof, including software running on a general purpose computer or in the form of a specialized hardware.

It is contemplated for embodiments to extend to individual elements and concepts described herein, independently of other concepts, ideas or system, as well as for embodiments to include combinations of elements recited anywhere in this application. Although illustrative embodiments have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

In general, the routines executed to implement the embodiments, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects. Moreover, while the invention has been described in the context of fully functioning computers and computer systems, those skilled in the art will appreciate that the various embodiments are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), and flash drives, among others.

Although the present invention has been described with reference to specific exemplary embodiments, it will be evident that the various modification and changes can be made to these embodiments without departing from the broader spirit of the invention.

What is claimed is:

1. A method for storing and retrieving solutions, the method comprising:
   receiving, from a solution provider through an interface, a solution for a problem, the received solution comprising a plurality of specifications including at least one specification to which a positive value has been assigned and at least one specification to which a negative value has been assigned;
   storing the received solution in a storage;
   displaying the plurality of specifications to a solution seeker;
   receiving information, from the solution seeker, about at least one specification selected by the solution seeker from the plurality of specifications; and
   in response to the received information indicating that the solution seeker selected from the plurality of specifications one or more of the at least one specification to which the positive value has been assigned, displaying the solution,
   wherein the plurality of specifications further includes at least one specification to which a not relevant value has been assigned, and
   wherein in response to the received information indicating that the solution seeker selected from the plurality of specifications one or more of the at least one specification to which the not relevant value has been assigned, the solution is neither caused to be displayed nor prevented from being displayed based on the selection of the one or more specification to which the not relevant value has been assigned.

2. The method according to claim 1, wherein the displaying of the solution is prevented in response to the received information indicating that the solution seeker selected from the plurality of specifications one or more of the at least one specification to which the negative value has been assigned.

3. The method according to claim 1, wherein the plurality of specifications further comprises at least one combination of two or more specifications to which the positive value has been assigned.

4. The method according to claim 1, wherein a specification hierarchy is defined whereby at least one specification from the plurality of specifications is defined as a mother specification, and at least one other specification from the plurality of specifications is defined as a child specification, and the child specification is only displayed on the interface in response to at least one of the mother specifications having been selected on the interface.

5. The method according to claim 1, further comprising:
   receiving a selection of at least one of the plurality of specifications on an interface from a user, thereby creating an information request;
   displaying the information request by displaying selected specifications on the interface;
   submitting information for the information request; and
   alerting the user who set up the information request in response to entered information being available.

6. A method for storing and retrieving solutions, the method comprising:
   receiving, from a solution provider through an interface, a solution for a problem, the received solution comprising a plurality of specifications including at least one specification to which a positive value has been assigned and at least one specification to which a negative value has been assigned;
   storing the received solution in a storage;
   displaying the plurality of specifications to a solution seeker;
   receiving information, from the solution seeker, about at least one specification selected by the solution seeker from the plurality of specifications; and
   in response to the received information indicating that the solution seeker selected from the plurality of specifications one or more of the at least one specification to which the positive value has been assigned, displaying the solution,
   wherein a set of at least two specifications are defined as mutually exclusive, and in response to at least one of the specifications in the set of mutually exclusive specifications being selected, other specifications in the set of mutually exclusive specifications are removed from display in an area where specifications are selectable on the interface.

7. A method for storing and retrieving solutions, the method comprising:
   receiving, from a solution provider through an interface, a solution for a problem, the received solution comprising a plurality of specifications including at least one specification to which a positive value has been assigned and at least one specification to which a negative value has been assigned;
   storing the received solution in a storage;

displaying the plurality of specifications to a solution seeker;

receiving information, from the solution seeker, about at least one specification selected by the solution seeker from the plurality of specifications; and in response to the received information indicating that the solution seeker selected from the plurality of specifications one or more of the at least one specification to which the positive value has been assigned, displaying the solution, wherein a set of at least two specifications are defined as mutually exclusive, and in response to at least one of the specifications in the set of mutually exclusive specifications being selected, a visual display is changed on the interface to indicate that other specifications in the set of mutually exclusive specifications are less relevant.

8. A non-transitory computer readable medium storing a program causing a computer to execute a method for storing and retrieving solutions, the method comprising:

receiving, from a solution provider through an interface, a solution for a problem, the received solution comprising a plurality of specifications including at least one specification to which a positive value has been assigned and at least one specification to which a negative value has been assigned;

storing the received solution in a storage;

displaying the plurality of specifications to a solution seeker;

receiving information, from the solution seeker, about at least one specification selected by the solution seeker from the plurality of specifications; and in response to the received information indicating that the solution seeker selected from the plurality of specifications one or more of the at least one specification to which the positive value has been assigned, displaying the solution, wherein the plurality of specifications further includes at least one specification to which a not relevant value has been assigned, and wherein in response to the received information indicating that the solution seeker selected from the plurality of specifications one or more of the at least one specification to which the not relevant value has been assigned, the solution is neither caused to be displayed nor prevented from being displayed based on the selection of the one or more specification to which the not relevant value has been assigned.

9. The non-transitory computer readable medium according to claim 8, wherein the displaying of the solution is prevented in response to the received information indicating that the solution seeker selected from the plurality of specifications one or more of the at least one specification to which the negative value has been assigned.

10. The non-transitory computer readable medium according to claim 8, wherein the plurality of specifications further comprises at least one combination of two or more specifications to which the positive value has been assigned.

11. The non-transitory computer readable medium according to claim 8, wherein a specification hierarchy is defined whereby at least one specification from the plurality of specifications is defined as a mother specification, and at least one other specification from the plurality of specifications is defined as a child specification, and the child specification is only displayed on the interface in response to at least one of the mother specifications having been selected on the interface.

12. The non-transitory computer readable medium according to claim 8, further comprising:

receiving a selection of at least one of the plurality of specifications on an interface from a user, thereby creating an information request;

displaying the information request by displaying selected specifications on the interface;

submitting information for the information request; and alerting the user who set up the information request in response to entered information being available.

13. A non-transitory computer readable medium storing a program causing a computer to execute a method for storing and retrieving solutions, the method comprising:

receiving, from a solution provider through an interface, a solution for a problem, the received solution comprising a plurality of specifications including at least one specification to which a positive value has been assigned and at least one specification to which a negative value has been assigned;

storing the received solution in a storage;

displaying the plurality of specifications to a solution seeker;

receiving information, from the solution seeker, about at least one specification selected by the solution seeker from the plurality of specifications; and in response to the received information indicating that the solution seeker selected from the plurality of specifications one or more of the at least one specification to which the positive value has been assigned, displaying the solution, wherein a set of at least two specifications are defined as mutually exclusive, and in response to at least one of the specifications in the set of mutually exclusive specifications being selected, other specifications in the set of mutually exclusive specifications are removed from display in an area where specifications are selectable on the interface.

14. A non-transitory computer readable medium storing a program causing a computer to execute a method for storing and retrieving solutions, the method comprising:

receiving, from a solution provider through an interface, a solution for a problem, the received solution comprising a plurality of specifications including at least one specification to which a positive value has been assigned and at least one specification to which a negative value has been assigned;

storing the received solution in a storage;

displaying the plurality of specifications to a solution seeker;

receiving information, from the solution seeker, about at least one specification selected by the solution seeker from the plurality of specifications; and in response to the received information indicating that the solution seeker selected from the plurality of specifications one or more of the at least one specification to which the positive value has been assigned, displaying the solution, wherein a set of at least two specifications are defined as mutually exclusive, and in response to at least one of the specifications in the set of mutually exclusive specifications being selected, a visual display is changed on the interface to indicate that other specifications in the set of mutually exclusive specifications are less relevant.

15. A system for storing and retrieving solutions, the system comprising:

a solution receiver configured to receive a solution entered by a solution provider for a problem through an interface, the received solution comprising a plurality of specifications including at least one specification to which a positive value has been assigned and at least one specification to which a negative value has been assigned;

a storage configured to store the solution received by the solution receiver;

an information request receiver configured to receive information, from a solution seeker, about at least one specification selected by the solution seeker from the plurality of specifications; and a solution provider configured to, in response to the information received by the information request receiver indicating that the solution seeker selected from the plurality of specifications one or more of the at least one specification to which the positive value has been assigned, cause the solution to be displayed to the solution seeker, wherein the plurality of specifications further includes at least one specification to which a not relevant value has been assigned, and wherein the solution provider, in response to the received information indicating that the solution seeker selected from the plurality of specifications one or more of the at least one specification to which the not relevant value has been assigned, is further configured to neither cause the solution to be displayed nor prevent the solution from being displayed based on the selection of the one or more specification to which the not relevant value has been assigned.

16. The system according to claim 15, where the solution provider is further configured to prevent the displaying of the solution in response to the received information indicating that the solution seeker selected from the plurality of specifications one or more of the at least one specification to which the negative value has been assigned.

17. The system according to claim 15, wherein the plurality of specifications further comprises at least one combination of two or more specifications to which the positive value has been assigned.

* * * * *